United States Patent [19]

Oberto

[11] Patent Number: 4,800,306
[45] Date of Patent: Jan. 24, 1989

[54] DEVICE FOR DAMPING THE OSCILLATIONS OF A STEPPING MOTOR

[75] Inventor: Massimo Oberto, Via Belvedere, Italy

[73] Assignee: Ing. C. Olivetti & C., S.p.A., Turin, Italy

[21] Appl. No.: 36,576

[22] Filed: Apr. 10, 1987

[30] Foreign Application Priority Data

May 19, 1986 [IT] Italy ................... 87410 A/86

[51] Int. Cl.⁴ ............................................. H02K 5/24
[52] U.S. Cl. .......................................... 310/51; 310/43;
    310/49 R; 310/74; 74/594; 188/379; 336/100
[58] Field of Search ................ 310/74, 49 R, 51, 153,
    310/42, 43; 74/572, 574; 188/378, 379, 380;
    336/100

[56] References Cited

U.S. PATENT DOCUMENTS

| | | | |
|---|---|---|---|
| 1,756,689 | 4/1930 | Jenkins | 310/746 |
| 1,964,054 | 7/1934 | Harris | 74/574 |
| 3,197,659 | 7/1965 | Marshall | 310/746 |
| 3,226,579 | 12/1965 | Bygdnes | 310/746 |
| 3,545,301 | 12/1970 | Richter | 310/746 |
| 4,049,985 | 9/1977 | Sudler | 310/746 |
| 4,563,605 | 1/1986 | Gerber | 310/74 |

Primary Examiner—R. Skudy
Attorney, Agent, or Firm—Banner, Birch, McKie & Beckett

[57] ABSTRACT

The device comprises an external inertia element which is fixed to a damping member which is coaxially fixed with respect to a shaft of a stepping motor, in such a way that it can rotate together therewith. The external inertia element comprises a metal mass in the form of an annulus of limited thickness. The damping member comprises a first circular flange to which the annulus is fixed, a second circular flange by means of which the device is fixed to the shaft and an annulus of elastomeric material connecting the two flanges. The materials and the dimensions of the device can be calculated, proportioned and pre-arranged in such a way that the device is compact but can stop oscillations of the stepping motor in a very short time. The device is particularly suited to damping the oscillations of a stepping motor which is used for example for positioning a printing member with respect to a print point or for positioning a recording head with respect to a magnetic disc.

2 Claims, 1 Drawing Sheet

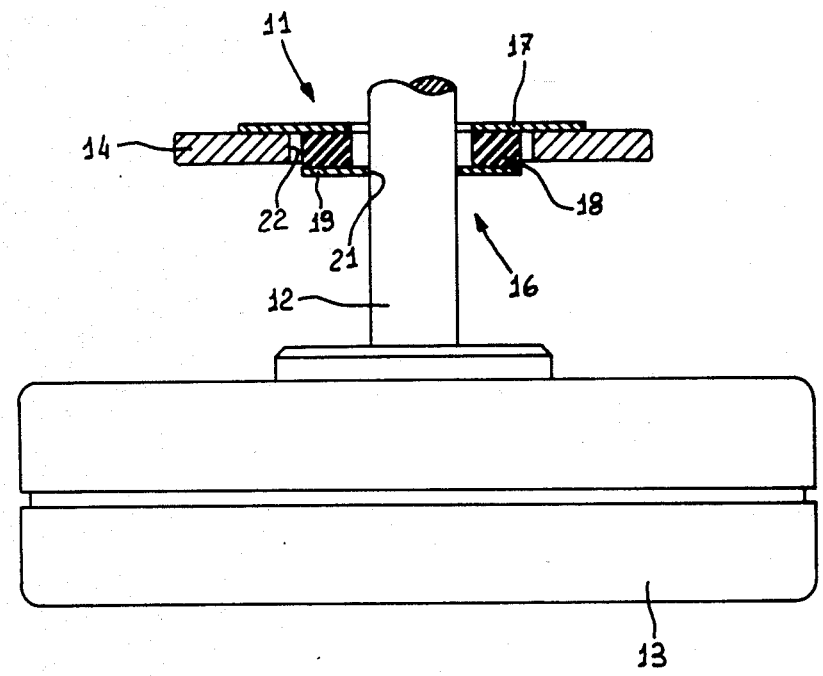

DEVICE FOR DAMPING THE OSCILLATIONS OF A STEPPING MOTOR

BACKGROUND OF THE INVENTION

The present invention relates to a device for damping the oscillations of a stepping motor, which may be used for example for positioning a printing member with respect to a print point in a printing machine or typewriter or for positioning one or more recording heads with respect to a magnetic disc.

The device comprises an external inertia element fixed to a damping member which is fixed with respect to the shaft of the stepping motor.

For the purposes of damping the oscillations that the shaft of a stepping motor tends to have around the angular position which is reached after a rotary movement of greater or lesser amplitude, a device is known which comprises a cylindrical container having an annular cavity filled with lubricant and within which there is rotatably mounted a metal annular member which can rotate freely due to inertia within the container. That damping device of known type, while being effective, suffers nonetheless from the disadvantage of requiring suitable expensive mounting elements which are interposed between the container and the shaft in order to prevent the lubricant which consists of oil from escaping from the container.

SUMMARY OF THE INVENTION

The aim of the present invention is therefore to provide a device for damping the oscillations of the shaft of a stepping motor, which is simple, functional, inexpensive and easy to fit.

In accordance with that aim, and overcoming the disadvantage of the known device, the device according to the invention is characterised in that the external inertia element comprises annular inertial mass and the damping member comprises a flange by means of which the device is fixed to the shaft of the stepping motor and an element of elastomeric material which is fixed between the flange and the inertial mass.

These and other features of the device according to the invention will be more clearly apparent from the following description of a preferred embodiment which is given by way of non-limiting example with reference to the accompanying drawing showing a partly sectional longitudinal view on an enlarged scale of the device according to the invention.

BRIEF DESCRIPTION OF THE DRAWING

The FIGURE shows a device for damping the oscillations of a stepping motor.

DESCRIPTION OF THE PREFERRED EMBODIMENTS

Referring to the drawing, a device for damping oscillations, according to the invention, is generally identified by reference numeral 11 and is applied to a shaft 12 of a stepping motor 13. The stepping motor 13 is a conventional stepping motor of the type involving a power supply at 5 volts, 0.5 ampere, at a frequency of 250 Hertz, with a maximum torque of 620 grams per centimeter and with an elementary step of 0.45°, such a motor being known per se and not described in detail and in the drawing. The device 11 comprises an external inertia element 14 and a damping member 16.

The external inertia element 14 comprises an inertial mass of metal material in the form substantially of an annulus of limited thickness. The damping member 16 comprises a first circular flange 17 to which the external inertia element 14 is fixed for example by means of spot welding, an element 18 of elastomeric material in the form of an annular portion and a second circular flange 19 having a hole 21 by means of which the device 11 is fixed in any known manner to the shaft 12 of the stepping motor 13, thus making fitting of the device 11 to the shaft 12 a very simple matter.

The external inertia element 14 has a central hole 22 which accommodates with clearance the element 18, which is fixed between the first flange 17 and the second flange 19. As can be clearly seen from the drawing, the external inertia element 14, the first flange 17, the element 18 and the second flange 19 are parallel and coaxial with each other and also coaxial with respect to the shaft 12. The first flange 17 and the second flange 19 are each formed by a thin metal plate.

The materials and the dimensions of the external inertia element 14 and the damping member 16 have been calculated, proportioned and prearranged in such a way that the dimensions of the device 11 are greatly reduced; the device 11 is compact. Nevertheless, the device can suppress oscillations of the stepping motor 13 in a very short time. In particular the external inertia element 14, the first circular flange 17 and the second circular flange 19 are of metal material while the element 18 is of commercial bromobutyl rubber with a hardness of 30 Shore A.

The external inertia element 14 may have an outside diameter of around 27.5 mm, with the hole 22 of a diameter around 14 mm, and a thickness of around 1.5 mm. The outside diameter of the first flange 17 may be about 20 mm, with an inside diameter of 7 mm and a thickness of around 2 tenths of a millimeter. The second flange 19 may have an outside diameter of about 12.5 mm with an inside diameter of about 2.5 mm and a thickness of about 2 tenths of a millimeter. The element 18 may have an outside diameter of about 12.5 mm with an inside diameter of about 7 mm and a thickness of about 2 mm. The element 18 is produced by means of vulcanisation, the first flange 17 and the second flange 19 being thereby bonded to the forces thereof to produce a single component.

The device 11 has been designed and calculated in such a way that, with the above-described dimensions, it is capable of damping the oscillations of the motor 13 which are at around 250 Hertz in 15 milliseconds, while without the device 11, they require about 300 milliseconds.

The mode of operation of the device 11 as described hereinbefore is as follows:

During the rotary movement of the shaft 12, for example for positioning a printing member with respect to a print point or for positioning one or more recording heads with respect to a magnetic disc, in any known manner which is not described and illustrated in the drawing, the device 11 which is fixed to the shaft 12 is also caused to rotate. When the shaft 12 reaches the predetermined angular position after a rotary movement of greater or lesser amplitude, it is stopped, with a tendency to oscillate about the position reached. The device 11 effectively damps the oscillations at a very high frequency which the shaft 12 tends to perform around the position reached and caused by the typical magnetic structure of the stepping motor 13.

It will be apparent that both when at rest and also during operation thereof, the device 11 according to the invention does not suffer from any disadvantages.

Among possible modifications, the inertial mass and the element of elastomeric material may be of a different form from that described and in particular they may be subdivided into sectors or lamination layers, with equivalent inertial and damping functions respectively.

What I claim is:

1. A device for damping the oscillations of a stepping motor of the type wherein the stepping motor comprises a shaft, and the damping device comprises an external inertia element and a damping member, wherein the external inertia element comprises an inertial mass of metal material in the form of an annulus of limited thickness having a central hole with an internal cylindrical surface, wherein the damping member comprises a first circular flange to which the external inertia element is fixed by means of spot welding and having a central hole, an element of elastomeric material in the form of an annular portion which is housed in the central hole of the external inertia element with clearance with respect to the internal cylindrical surface of the central hole and to the external surface of the shaft, and a second circular flange having a hole by means of which the damping device is fixed to the shaft, wherein the elastomeric element is fixed between the first circular flange and the second circular flange, and wherein the external inertia element, the first circular flange, the elastomeric element and the second circular flange are parallel and coaxial with each other and also coaxial with respect to the shaft.

2. A device according to claim 1, wherein the first circular flange and the second circular flange are each formed by a thin metal plate and are bonded to the elastomeric element to produce a single component.

* * * * *